United States Patent
Lin

(10) Patent No.: US 9,925,686 B2
(45) Date of Patent: Mar. 27, 2018

(54) FEEDING DEVICE WITH SPRING-LOADED FEEDING ROLLERS

(71) Applicant: Chin-Chi Lin, Taichung (TW)

(72) Inventor: Chin-Chi Lin, Taichung (TW)

( * ) Notice: Subject to any disclaimer, the term of this patent is extended or adjusted under 35 U.S.C. 154(b) by 138 days.

(21) Appl. No.: 15/204,149

(22) Filed: Jul. 7, 2016

(65) Prior Publication Data

US 2018/0009606 A1    Jan. 11, 2018

(51) Int. Cl.
| | |
|---|---|
| B27B 25/02 | (2006.01) |
| B65G 13/07 | (2006.01) |
| B65G 13/04 | (2006.01) |
| B65G 39/12 | (2006.01) |
| B27B 25/08 | (2006.01) |
| B27C 1/12 | (2006.01) |
| B23Q 7/05 | (2006.01) |
| B23Q 3/00 | (2006.01) |

(52) U.S. Cl.
CPC ............ *B27B 25/02* (2013.01); *B23Q 3/002* (2013.01); *B23Q 7/055* (2013.01); *B27B 25/08* (2013.01); *B27C 1/12* (2013.01); *B65G 13/04* (2013.01); *B65G 13/07* (2013.01); *B65G 39/12* (2013.01)

(58) Field of Classification Search
CPC ........ B65G 13/04; B65G 13/07; B65G 39/12; B27B 25/02; B27B 25/08; B27C 1/12; B23Q 3/002; B23Q 7/055

USPC ........ 198/782, 842, 843, 608, 624; 193/35 B
See application file for complete search history.

(56) References Cited

U.S. PATENT DOCUMENTS

| | | | | |
|---|---|---|---|---|
| 4,483,378 A | * | 11/1984 | Chang | B23Q 5/385 |
| | | | | 144/136.1 |
| 5,799,854 A | * | 9/1998 | Lin | B23Q 7/055 |
| | | | | 144/246.1 |
| 6,016,593 A | * | 1/2000 | Kyrstein | B27B 25/02 |
| | | | | 198/615 |
| 8,931,528 B2 | * | 1/2015 | Hsiung | B27B 25/10 |
| | | | | 144/242.1 |

* cited by examiner

*Primary Examiner* — Leslie A Nicholson, III
*Assistant Examiner* — Keith R Campbell
(74) *Attorney, Agent, or Firm* — Trop Pruner & Hu, P.C.

(57) ABSTRACT

A feeding device includes a plurality of driving modules, a plurality of feeding modules and a plurality of couplers. Each driving module has a driving shaft pivotally mounted on a housing and driven by a power module to be rotated about an axis. Each feeding module includes a pivoting shaft substantially coaxial with the driving shaft, a suspending unit journalled on the pivoting shaft to be pivotable and having a bearing portion which is disposed to be biased downwardly by a spring member, a driven shaft mounted rotatably on the bearing portion, and a feeding roller driven by the driven shaft. Each coupler includes a transmitting shaft having two ends connected to the driving shaft and driven shaft by universal joints, respectively.

8 Claims, 8 Drawing Sheets

FEEDING DEVICE WITH SPRING-LOADED FEEDING ROLLERS

FIELD

The disclosure relates to a feeding device, and more particularly to a feeding device with spring-loaded feeding rollers for feeding and pressing an elongated workpiece.

BACKGROUND

A conventional feeding device with feeding rollers is generally employed for feeding an elongated workpiece to be machined, such as a wood or metal plate. To maintain a stable feeding movement of a workpiece with an uneven configuration, each feeding roller is coupled with and driven by an individual transmitting unit which is pivotably mounted on a feeding machine so as to provide a constant urging force by means of a spring to permit each feeding roller to continually press a workpiece during a feeding process. However, the transmitting units are complicated in construction, which results in high manufacturing and maintenance costs.

Another transmission construction for feeding rollers of a feeding machine disclosed in Chinese Patent No. 203754045U is provided with chain and gear assemblies for transmitting a power of a motor to two driving shafts of two transmitting roller units, which simultaneously rotate two feeding rollers of each transmitting roller unit. However, the two feeding rollers could rotate at different speeds when a workpiece of uneven thickness is fed, thereby adversely affecting the machining process thereof. Besides, two turnable mounting bodies disposed between a driving shaft of each transmitting roller unit and two roller shafts for a spring to be abutted thereagainst are needed for performing a pressing and feeding work, which results in restriction of the dimension and application of the feeding machine.

SUMMARY

Therefore, an object of the disclosure is to provide a feeding device that can alleviate at least one of the drawbacks of the prior art.

According to the disclosure, the feeding device includes a housing, a power module, a plurality of driving modules, a plurality of feeding modules and a plurality of couplers. Each of the driving modules includes a driving shaft which is pivotally mounted on the housing and driven by the power module to be rotated about an axis. Each of the feeding modules includes a pivoting shaft which is mounted on the housing and which extends along the axis to be substantially coaxial with the driving shaft of a respective one of the driving modules, a suspending unit which is journalled on the pivoting shaft to be pivotable about the axis and which has a bearing portion offset from and parallel to the axis, a spring member which is disposed to bias the bearing portion downwardly, a driven shaft which is mounted on the bearing portion to be biased by a biasing action of the spring member and which is rotatable relative to the bearing portion, and a feeding roller which is mounted on and driven by the driven shaft. Each of the couplers includes a transmitting shaft, a first universal joint interconnecting an end of the transmitting shaft and the driving shaft of a respective one of the feeding modules, and a second universal joint interconnecting an opposite end of the transmitting shaft and the driven shaft of the respective one of the feeding modules.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
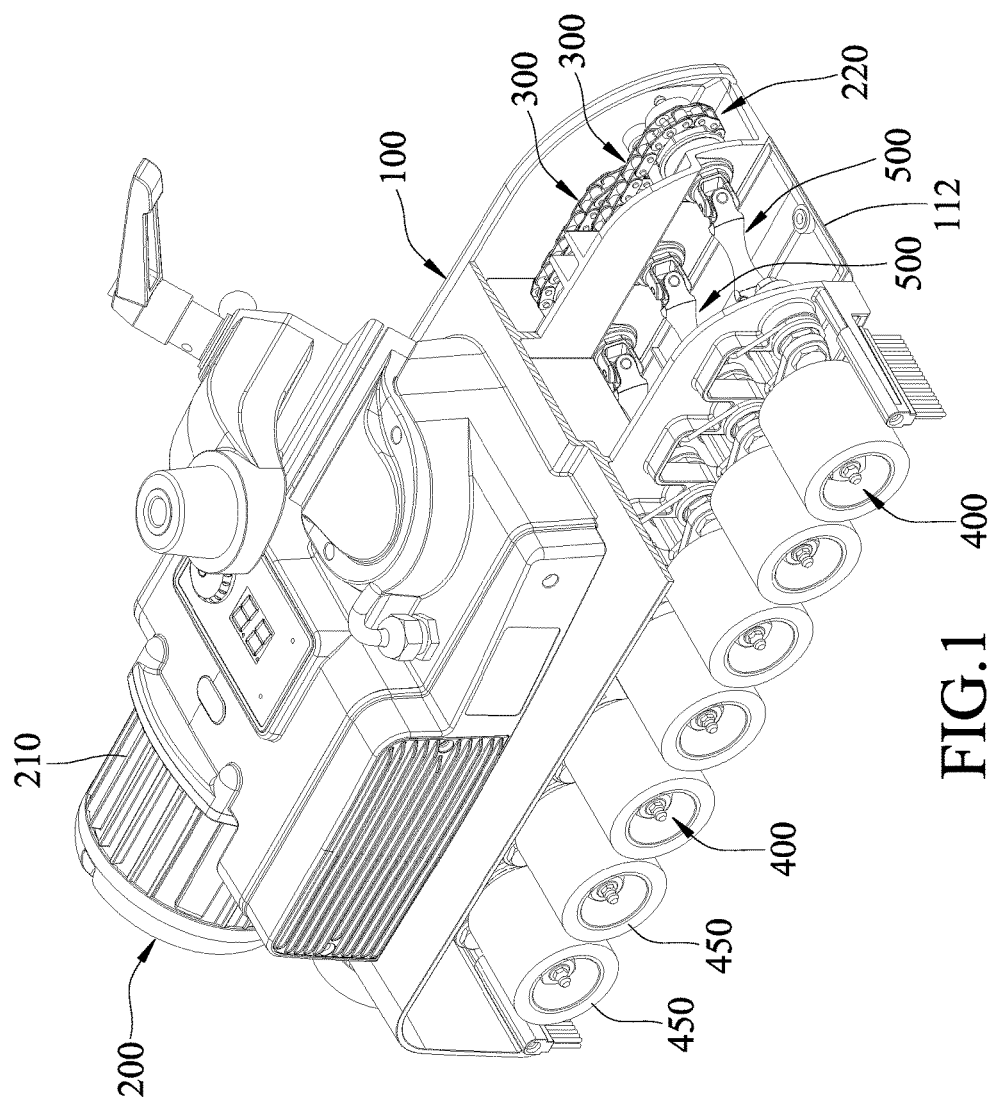
FIG. 1 is a partly cut-away perspective view illustrating an embodiment of a feeding device according to the disclosure.

Referring to FIG. 1, the embodiment of the feeding device is shown to include a housing 100, a power module 200, a plurality of driving modules 300, a plurality of feeding modules 400 and a plurality of couplers 500. The number of the driving modules 300 and the number of the couplers 500 are the same as that of the feeding modules 400. For example, seven feeding modules 300 are disposed in this embodiment.

Figure 2:
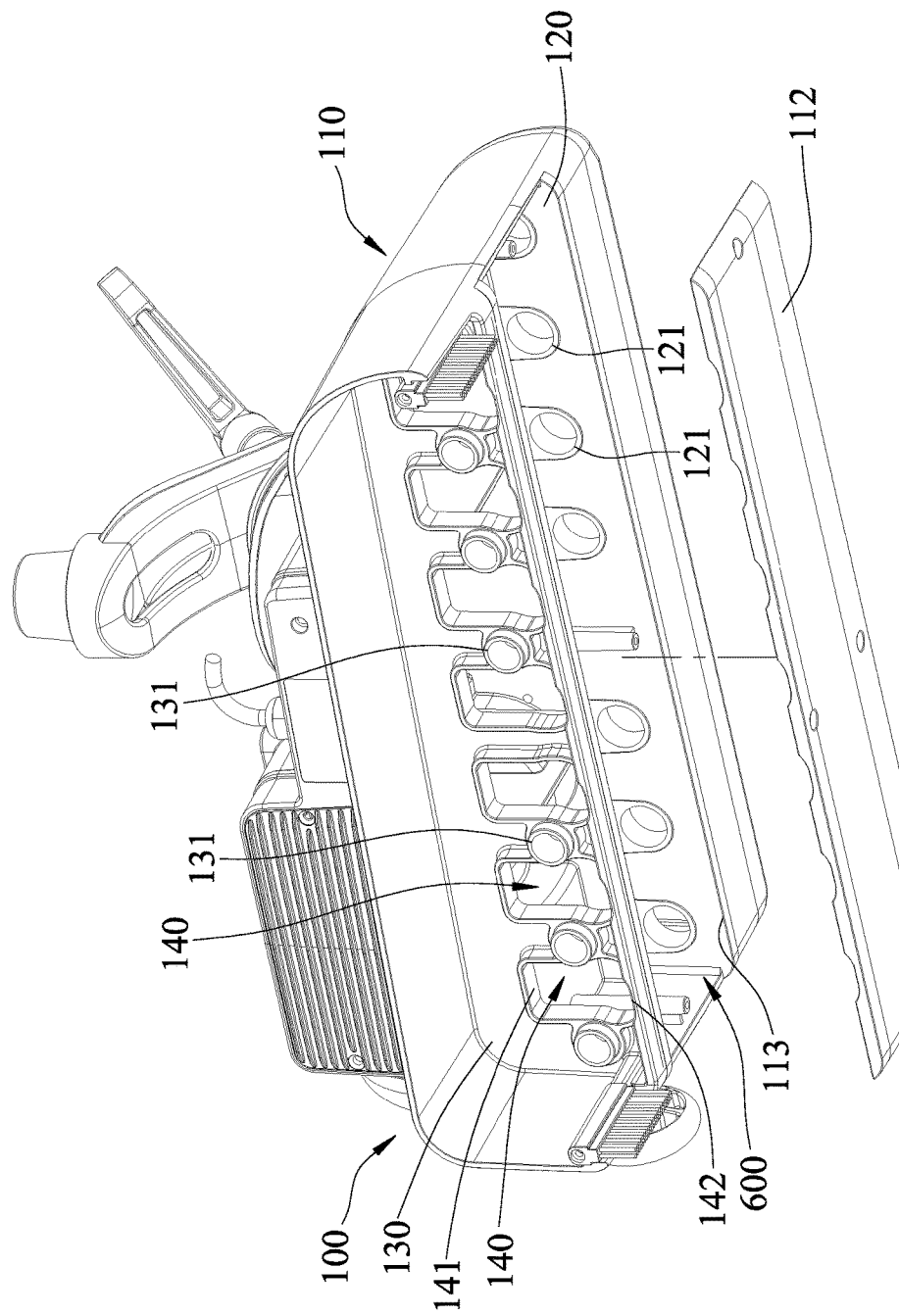
FIG. 2 is an exploded perspective view of the embodiment with parts thereof omitted for sake of clarity.

Referring to FIG. 2, the housing 100 includes an enclosing wall 110, a first standing wall 120 extending uprightly and downwardly from the enclosing wall 110 and having a plurality of first axial holes 121, and a second standing wall 130 extending downwardly and uprightly from the enclosing wall 110, spaced apart from the first standing wall 120, and having a plurality of second axial holes 131 and a plurality of restricting holes 140 adjacent to the second axial holes 131, respectively. The enclosing wall 110, the first standing wall 120 and the second standing wall 130 cooperatively define a coupler accommodating chamber 600 for receiving the couplers 500, and an opening 113 for access to the coupler accommodating chamber 600. The housing 100 further includes a removable closure plate 112 disposed to close the opening 113. Each of the restricting holes 140 extends through the second standing wall 130 to be communicated with the coupler accommodating chamber 600, and is bounded by upper and lower ends 141, 142. Likewise, the numbers of the first and second axial holes 121, 131 are the same as that of the restricting holes 140 to be the same as that of the feeding modules 400.

Figure 3:
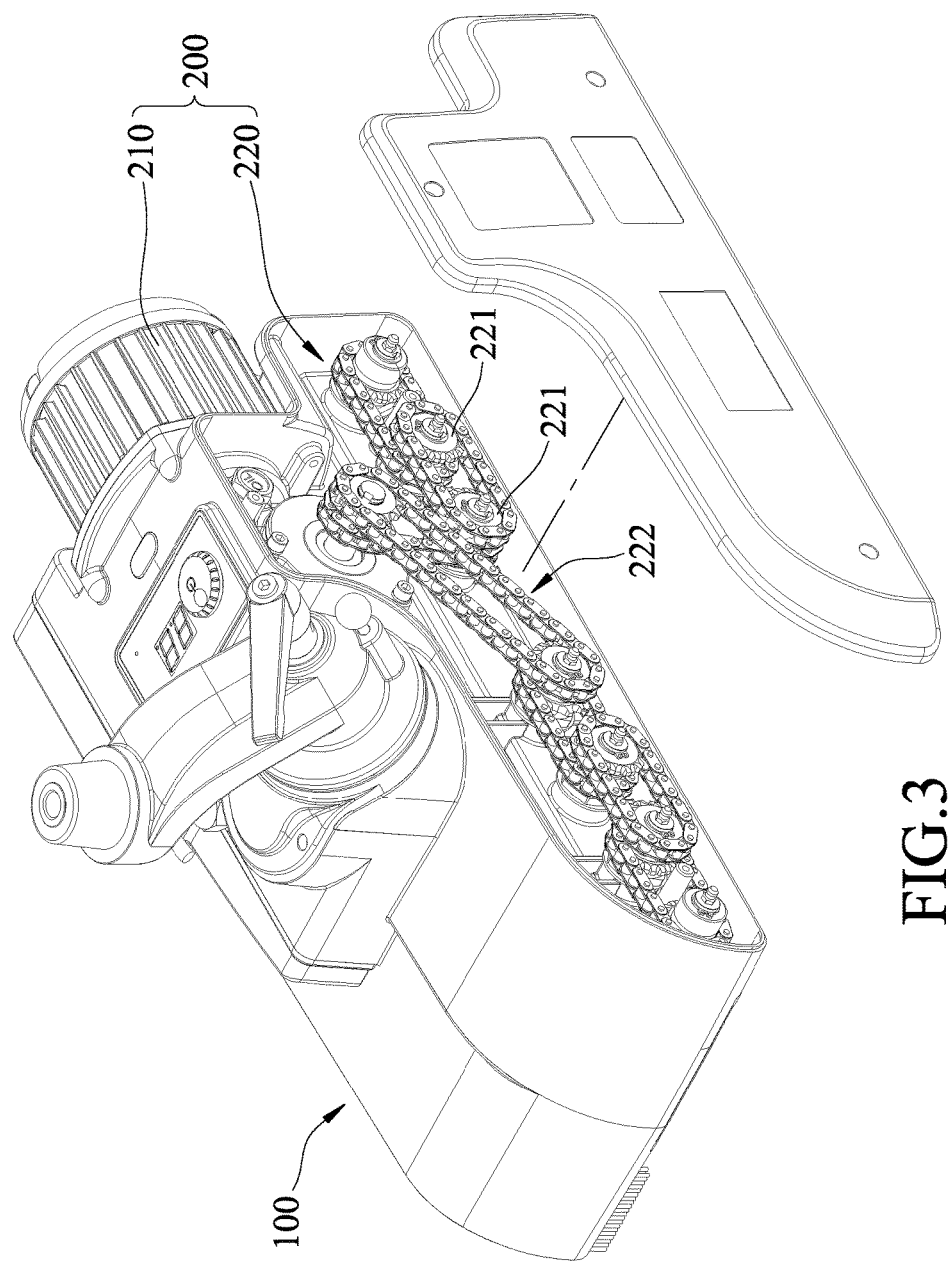
FIG. 3 is an exploded perspective view of the embodiment.

Referring to FIGS. 1 and 3, the power module 200 includes a motor 210 disposed on the housing 100, and a transmitting mechanism 220. The transmitting mechanism 220 includes a plurality of sprockets 221 and chains 222 interconnecting the sprockets 221 for simultaneous rotation of the sprockets 221. Since the construction of the sprockets 221 and the chains 222 is of a hitherto known type, a description thereof is omitted herein for the sake of brevity. Alternatively, the transmitting mechanism 220 is a belt and wheel assembly. By transmission of the sprockets 221 and the chains 222, the power from the motor 210 can be reliably transmitted to the driving modules 300, which has a simple and detachable construction for facilitating replacement and maintenance.

Figure 4:
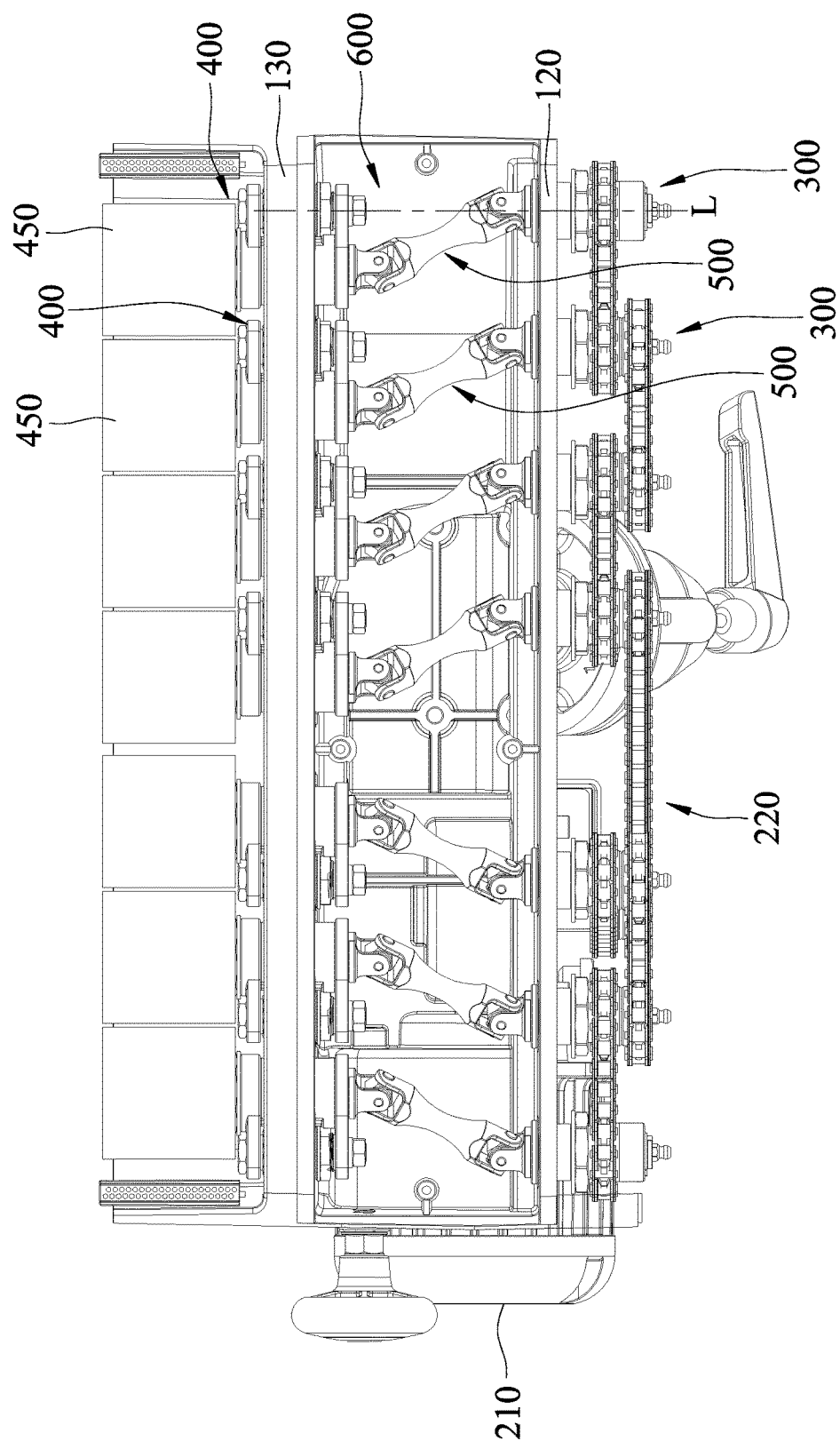
FIG. 4 is a schematic bottom view of the embodiment.
Figure 5:
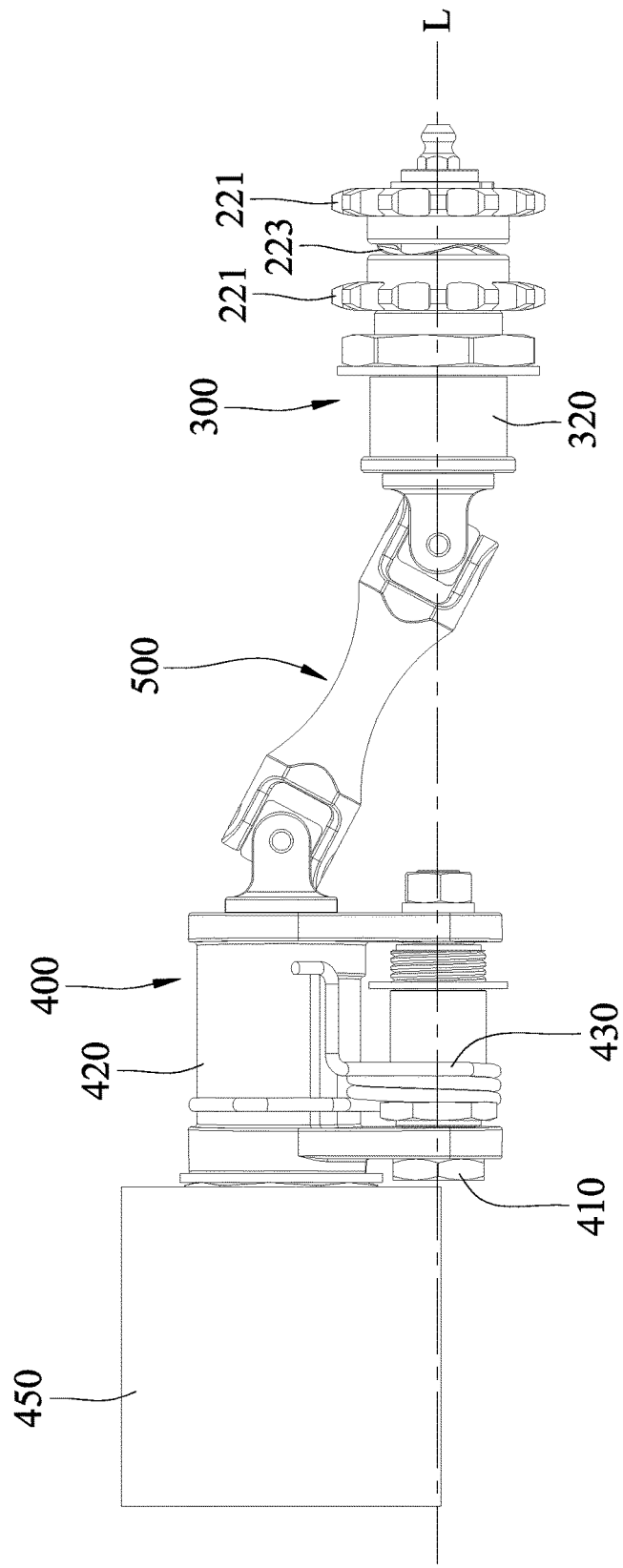
FIG. 5 is a schematic bottom view illustrating the structural relationship among a driving module, a feeding module and a coupler according to the embodiment.
Figure 8:
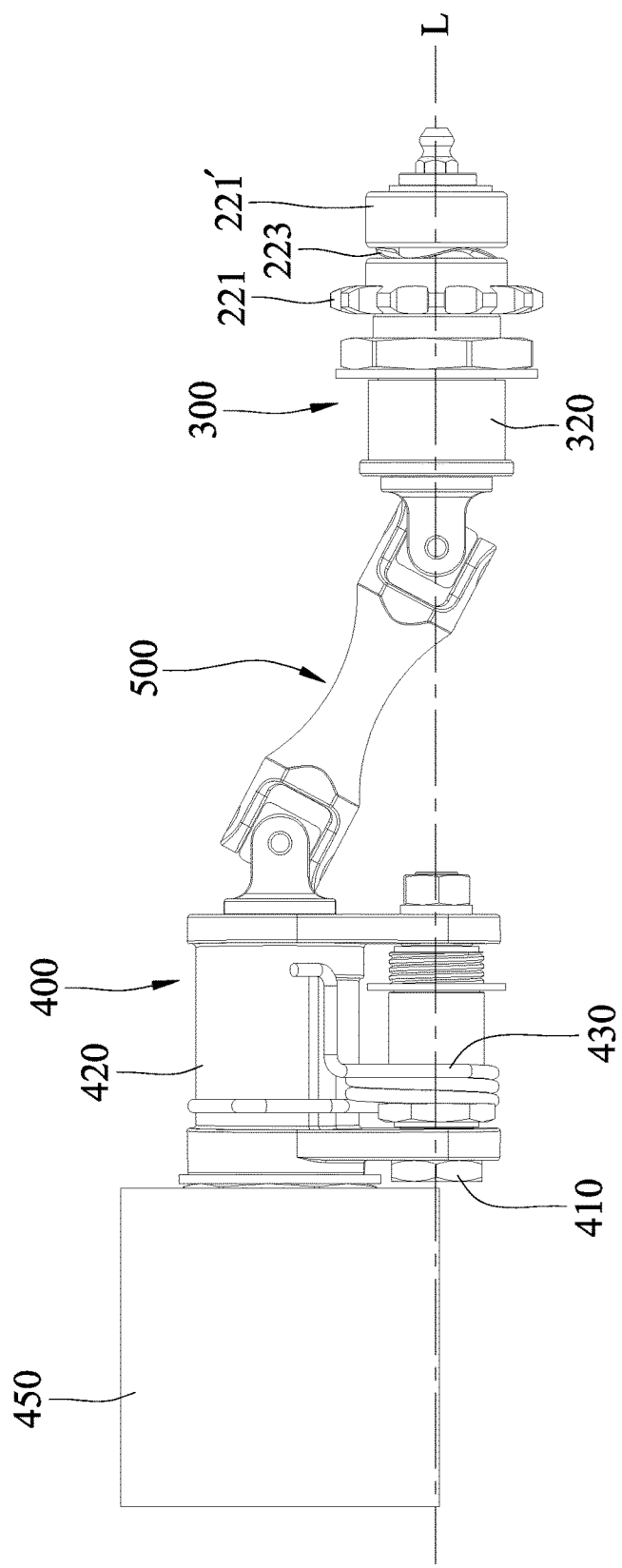
FIG. 8 is a schematic bottom view similar to FIG. 5, but illustrating a state where the driving module is coupled with a transmitting mechanism at a side of the feeding device.

Referring to FIGS. 1 and 4, the driving modules 300 are disposed on the first standing wall 120, and the feeding modules 400 are disposed on the second standing wall 130. The couplers 500 received in the coupler accommodating chamber 600 each interconnects one of the driving modules 300 and a respective one of the feeding modules 400, as shown in FIGS. 5 and 8. FIG. 5 shows a state where two sprockets 221 at the middle of the feeding device are coupled with the driving module 300. FIG. 8 shows a state where one sprocket 221 at either one side of the feeding device is coupled with the driving module 300, and a block 221' is disposed at the outer end instead of a sprocket. Thus, the assembly of each of the driving module 300, the feeding module 400 and the coupler 500 is driven by the power module 200 to be operated individually.

Figure 6:
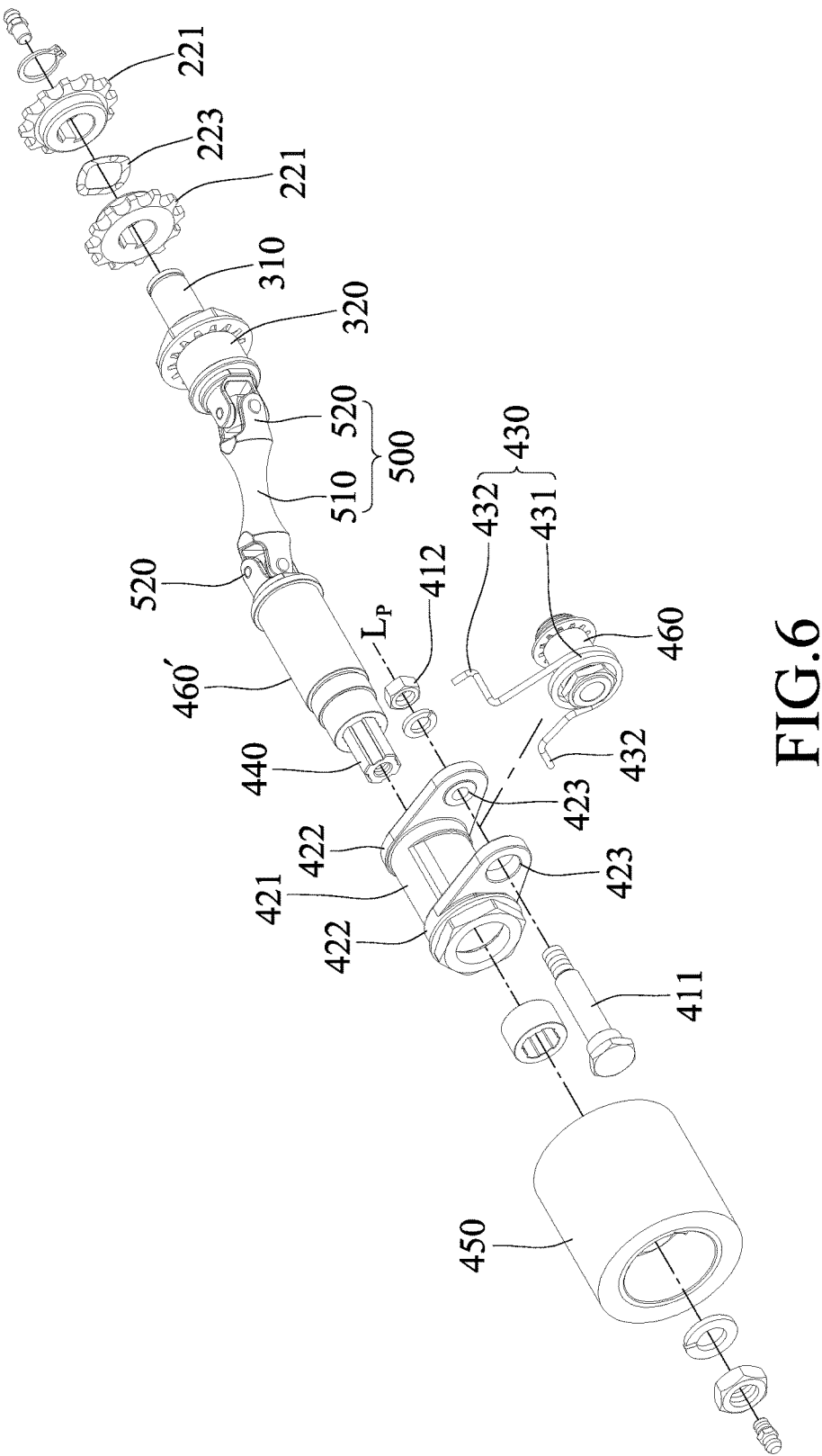
FIG. 6 is an exploded perspective view of the components shown in FIG. 5.

Referring to FIGS. 2, 5 and 6, each driving module 300 includes a driving shaft 310 which is pivotably mounted in the respective first axial hole 121 through a bearing 320. In this embodiment, the bearing 320 is a sliding bearing, such as an axle sleeve fitted in the first axial hole 121, so as to decrease the friction of the driving shaft 310 during rotation of the driving shaft 310 and to avoid deformation of the first axial hole 121. In other embodiments of the disclosure, the bearing 320 can also be a rolling bearing instead of the sliding bearing.

Figure 7:
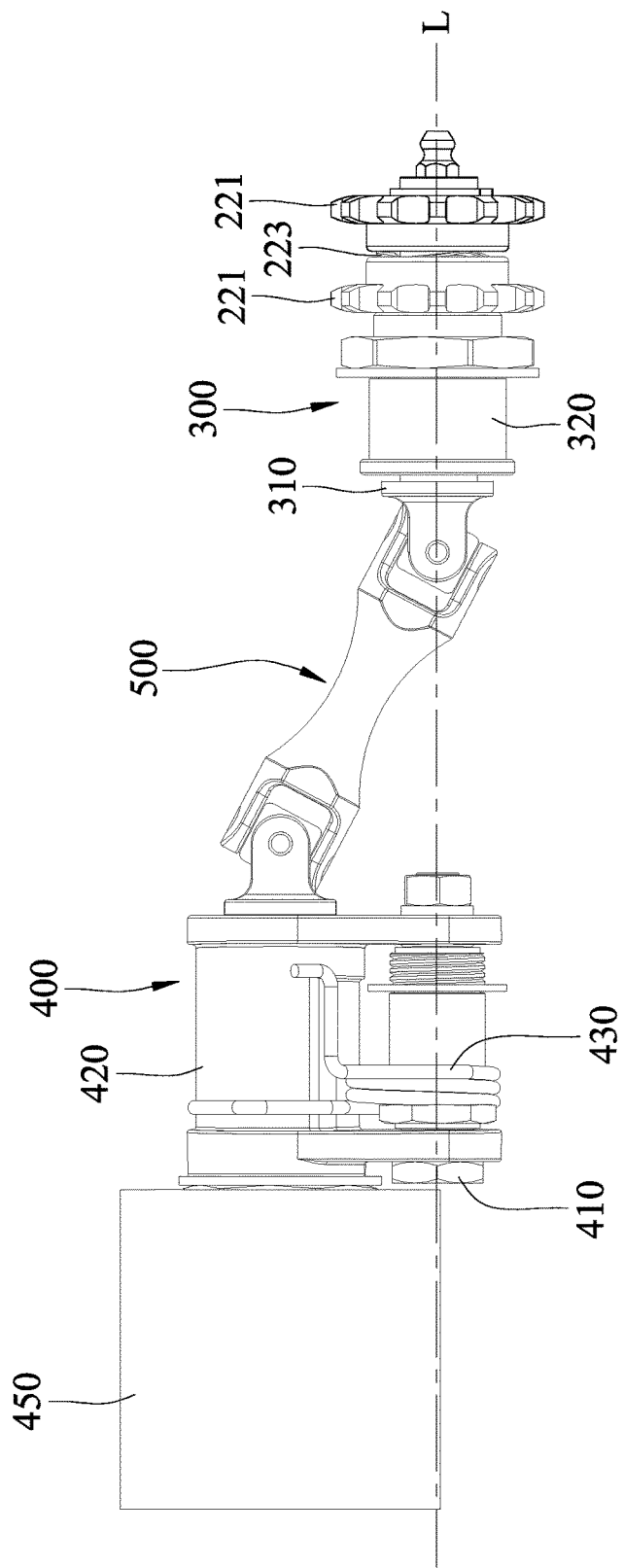
FIG. 7 is a schematic bottom view similar to FIG. 5, but illustrating a state where a shorter coupler is mounted.

Further, the driving shaft 310 has an end coupled with the coupler 500 and an opposite end for the sprockets 221 to be disposed thereon. A wave spring 223 is interposed between the sprockets 221 to provide an adjusting tolerance for the driving shaft 310 such that the driving shaft 310 is movable axially during assembly. For example, as shown in FIG. 7, when the horizontal length of the coupler 500 is relatively shorter, the driving shaft 310 is moved toward the feeding module 400 for compensation. Thus, the driving shaft 310 is driven by the power module 200 to be rotated about an axis.

Referring to FIGS. 2, 5 and 6, the feeding module 400 includes a pivoting shaft 410, a suspending unit 420, a spring member 430, a driven shaft 440 and a feeding roller 450. The pivoting shaft 410 in this embodiment includes a screw bolt 411 and a screw nut 412. The suspending unit 420 includes a bearing portion 421 and an extending portion 422 extending from the bearing portion 421. The extending portion includes two extending arms 422 spaced apart from each other, and respectively having pivot holes 423 that extend therethrough along an axis (Lp). The spring member 430 is a torsion spring which has a coil portion 431 and two spring ends 432. The spring member 430 can be a spring plate, a coil spring or any type of biasing spring which biases the bearing portion 421 of the suspending unit 420 toward the lower end 142 of the restriction hole 140.

Referring to FIGS. 1, 2 and 6, specifically, a bearing 460 is disposed in the second axial hole 131. The coil portion 431 of the spring member 430 is sleeved on the bearing 460 to have one spring end 432 abutting against the upper end 141 of the restriction hole 140. Subsequently, the extending arms 422 are disposed at two sides of the second standing wall 130 to align the pivot holes 423 with the bearing 460 along the axis (Lp). Meanwhile, the other spring end 432 of the spring member 430 is abutted against an upper edge of the bearing portion 421. Then, the screw bolt 411 extends through the pivot holes 423 and the bearing 460 and is secured by the screw nut 412. In this time, the axis (Lp) of the pivot shaft 410 is substantially coaxial with the driving shaft 310 to define a pivoting axis (L).

In other words, the suspending unit 420 is journalled on the pivoting shaft 410 to be pivotable about the pivoting axis (L) and the bearing portion 421 is disposed offset from and parallel to the pivoting axis (L) to be turnable between the upper and lower ends 141, 142 of the restriction hole 140, and to be biased downwardly by the biasing action of the spring member 430. Another bearing 460' is disposed in the bearing portion 421 such that the driven shaft 440 is mounted on and rotatable relative to the bearing portion 421. The driven shaft 440 is also biased by the biasing action of the spring member 430 and is movable along with the turning of the bearing portion 421. The feeding roller 450 is mounted on and driven by the driven shaft 440.

Referring to FIGS. 2, 5 and 6, the coupler 500 includes a transmitting shaft 510, a first universal joint 520 interconnecting an end of the transmitting shaft 510 and the driving shaft 310, and a second universal joint 520 interconnecting an opposite end of the transmitting shaft 510 and the driven shaft 440. By virtue of the rigid first and second universal joints 520, the rotary motion of the driving shaft 310 is transmitted to the driven shaft 440 with minimized power consumption, and the driven shaft 440 can be rotated at the same speed as the driving shaft 310. Such connectional structure is simple and convenient to assemble. Additionally, in this embodiment, the universal joints 520 are disposed such that the transmitting shaft 510 is inclined to the axis (L) with an included angle which is the same as that between the transmitting shaft 510 and an extension line of the driven shaft 440, and which is smaller than 30 degrees. Thus, the driving and driven shafts 310, 440 are kept substantially parallel to each other during the feeding operation, thereby resulting in stable and reliable transmission, and minimizing consumption of power transmission and undesired torque generated due to oscillation of the feeding operation.

As illustrated, when a workpiece of uneven thickness is fed, each feeding roller 430 is moved along with the respective driven shaft 440 and biased by the biasing action of the spring member 430 to press the workpiece. During the feeding operation, the included angle of the transmitting shaft 510 and the axis (L) is kept constant so that the rotary motion of the driving shaft 310 is transmitted steadily to the driven shaft 440 at a constant rotary speed, which results in a constant feeding rate of a workpiece to enhance the machining effect. The construction of the coupler 500 is simplified and convenient to manufacture. Moreover, the assemblies of the driving modules 300, the feeding modules 400 and the couplers 500 can be manufactured and adjusted individually so as to meet the requirements of customers at a relatively low manufacturing cost. For example, by changing the distance between two adjacent axial holes 121, 131 and restricting holes 140, the numbers thereof, or the diameter of the feeding rollers 450, the feeding device can be used for feeding workpieces of various lengths.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A feeding device comprising:
   a housing;
   a power module;
   a plurality of driving modules, each including a driving shaft which is pivotally mounted on said housing and driven by said power module to be rotated about an axis;
   a plurality of feeding modules, each including a pivoting shaft which is mounted on said housing and which extends along the axis to be substantially coaxial with said driving shaft of a respective one of said driving modules, a suspending unit which is journalled on said pivoting shaft to be pivotable about the axis and which has a bearing portion offset from and parallel to the axis, a spring member which is disposed to bias said bearing portion downwardly, a driven shaft which is mounted on said bearing portion to be biased by a biasing action of said spring member and which is rotatable relative to said bearing portion, and a feeding roller which is mounted on and driven by said driven shaft; and
   a plurality of couplers, each including a transmitting shaft, a first universal joint interconnecting an end of said transmitting shaft and said driving shaft of a respective one of said feeding modules, and a second universal joint interconnecting an opposite end of said transmitting shaft and said driven shaft of the respective one of said feeding modules.

2. The feeding device as claimed in claim 1, wherein said housing includes an enclosing wall, a first standing wall extending uprightly from said enclosing wall, and a second standing wall extending uprightly from said enclosing wall and spaced apart from said first standing wall, said enclosing wall, said first standing wall and said second standing wall cooperatively define a coupler accommodating chamber for receiving said couplers.

3. The feeding device as claimed in claim 2, wherein said enclosing wall, said first standing wall and said second standing wall cooperatively define an opening for access to said coupler accommodating chamber, said housing further including a removable closure plate which is disposed to close said opening, said first standing wall having a plurality of first axial holes for mounting said driving shafts of said driving modules therein, respectively, said second standing wall having a plurality of second axial holes for mounting said pivoting shafts of said feeding modules therein, respectively.

4. The feeding device as claimed in claim 3, wherein said suspending unit of each of said feeding modules has an extending portion which extends from said bearing portion to the axis to be journalled on said pivoting shaft.

5. The feeding device as claimed in claim 4, wherein said housing has a plurality of restricting holes extending through said second standing wall to be communicated with said coupler accommodating chamber, each of said restricting holes being bounded by upper and lower ends, said bearing portion of said suspending unit being mounted and movable in a respective one of said restricting holes, said extending portion including two extending arms which extend from said bearing portion and which are spaced apart from each other along the axis such that said extending arms are disposed at two sides of said second standing wall.

6. The feeding device as claimed in claim 5, wherein said extending arms respectively have pivot holes extending therethrough along the axis, said pivoting shaft of each of said feeding modules including a screw bolt extending through said pivot holes and said second axial hole, and a screw nut secured to said screw bolt such that said bearing portion is turnable along with said driven shaft between said upper and lower ends.

7. The feeding device as claimed in claim 5, wherein said spring member of each of said feeding modules is disposed between said upper end of a respective one of said restricting holes and said bearing portion so as to bias said bearing portion toward said lower end.

8. The feeding device as claimed in claim 7, wherein said spring member of each of said feeding modules is a torsion spring which has a coil portion sleeved around said bearing portion and two spring ends abutting against said upper end and said bearing portion, respectively.

* * * * *